United States Patent
Xue

(10) Patent No.: US 12,088,246 B2
(45) Date of Patent: Sep. 10, 2024

(54) APPARATUS, METHOD AND ARTICLE FOR MAXIMIZING SOLAR CHARGE CURRENT THROUGH THE USE OF SPLIT WIRE(S) IN A SOLAR ARRAY WITH SOLAR PANELS CONNECTED IN THE COMBINATION OF SERIES AND PARALLEL

(71) Applicant: Weihai Xue, Scarborough (CA)

(72) Inventor: Weihai Xue, Scarborough (CA)

(73) Assignee: WEIHAI XUE, Toronto (CA)

( * ) Notice: Subject to any disclaimer, the term of this patent is extended or adjusted under 35 U.S.C. 154(b) by 121 days.

(21) Appl. No.: 17/310,068

(22) PCT Filed: Sep. 26, 2019

(86) PCT No.: PCT/CA2019/051372
§ 371 (c)(1),
(2) Date: Jul. 14, 2021

(87) PCT Pub. No.: WO2021/051186
PCT Pub. Date: Mar. 25, 2021

(65) Prior Publication Data
US 2022/0200325 A1 Jun. 23, 2022

(30) Foreign Application Priority Data
Sep. 16, 2019 (CA) ..................................... 3055454

(51) Int. Cl.
*H02S 40/36* (2014.01)
*H02J 3/38* (2006.01)
*H02J 7/00* (2006.01)
*H02J 7/35* (2006.01)

(52) U.S. Cl.
CPC .............. *H02S 40/36* (2014.12); *H02J 3/381* (2013.01); *H02J 7/00304* (2020.01); *H02J 7/0048* (2020.01); *H02J 7/35* (2013.01); *H02J 2300/26* (2020.01)

(58) Field of Classification Search
CPC ...................................................... H02S 40/36
USPC ........................................................ 320/101
See application file for complete search history.

(56) References Cited

U.S. PATENT DOCUMENTS

| | | | |
|---|---|---|---|
| 2013/0269746 A1* | 10/2013 | Ramsey | H02S 40/36 174/84 R |
| 2016/0226254 A1* | 8/2016 | Cheng | H02J 1/10 |
| 2017/0366039 A1* | 12/2017 | Qin | H02J 7/0042 |
| 2018/0197254 A1* | 7/2018 | Yoscovich | H02J 7/35 |
| 2018/0287484 A1* | 10/2018 | Braginsky | H02J 3/381 |
| 2019/0157984 A1* | 5/2019 | Aloni | H02J 13/00002 |

(Continued)

*Primary Examiner* — Jerry D Robbins

(57) ABSTRACT

In a maximum power point tracking (MPPT) solar charging system, the solar array is re-configured to have the majority panels connected in parallel, while some panels remain in series for MPPT charge controller. The split wire(s) from the string of panels connected in series can be connected to all the other panels connected in parallel. The split wire is connected to the apparatus_Solar Charge Maximizing controller, to directly power a direct current_DC load, and to charge a battery or battery bank with the same nominal voltage. The solar charge maximizing controller(s) works in conjunction with MPPT charge controller(s) to maximize the total charge current in the ever-changing solar radiation conditions and in the constant changing DC load (inverters in general) conditions.

16 Claims, 10 Drawing Sheets

(56) References Cited

U.S. PATENT DOCUMENTS

Figure 1:
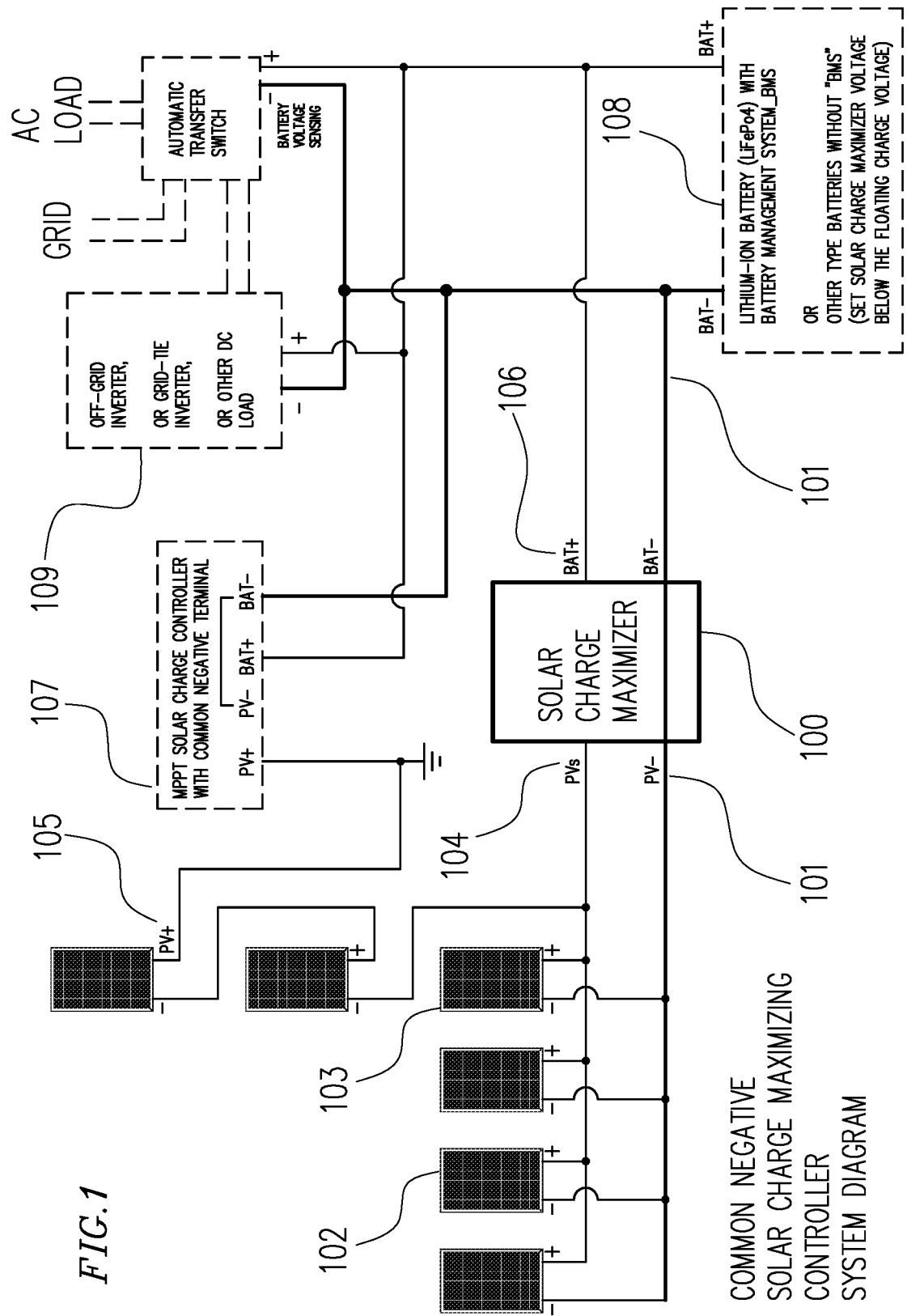

| | | | |
|---|---|---|---|
| 2020/0220360 A1* | 7/2020 | Cornelius | H02J 1/102 |
| 2022/0131383 A1* | 4/2022 | Milivojevic | H02J 1/106 |
| 2022/0200325 A1* | 6/2022 | Xue | H02J 3/381 |
| 2023/0336120 A1* | 10/2023 | Wang | H02S 40/36 |
| 2023/0352609 A1* | 11/2023 | Yoscovich | H01L 31/0201 |
| 2023/0369965 A1* | 11/2023 | Braginsky | H02M 7/44 |

* cited by examiner

COMMON NEGATIVE SOLAR CHARGE MAXIMIZING CONTROLLER SYSTEM DIAGRAM

APPARATUS, METHOD AND ARTICLE FOR MAXIMIZING SOLAR CHARGE CURRENT THROUGH THE USE OF SPLIT WIRE(S) IN A SOLAR ARRAY WITH SOLAR PANELS CONNECTED IN THE COMBINATION OF SERIES AND PARALLEL

PATENTS CITED

1. PHOTOVOLTAIC POWER REGULATION SYSTEM_CA 1226895, CPC 320/11, IPC H0O2J 7/00 (2006.01), H02J 7/35 (2006.01), 1987-09-15 by Jaster, Dale R;
2. SOLAR POWERED DC LOAD SYSTEM_CA 02762531, IPC H02J 7/00 (2006.1), HOIL 25/00 (2006.01), 20Dec. 1, 2006, by Carroll, Min;
3. SOLAR POWER MANAGEMENT SYSTEM_U.S. Pat. No. 8,258,741 B2, Sep. 4, 2012, by Wu ct al;
4. PHOTOVOLTAIC POWER STATION_U.S. Pat. No. 10,381,840 B2, Aug. 13, 2019, BY Shuy et al;
5. ADAPTABLE RECHARGING AND LIGHTING STATION AND METHOD OF USING THE SAME, U.S. Pat. No. 10,014,683, Jul. 3, 2018, by Ellenberger et al;
6. SOLAR POWER STORAGE MODULE AND SYSTEM AND SOLAR POWER SUPPLY SYSTEM, U.S. Pat. No. 9,082,897 B2, Jul. 14, 2015, by Liu et al;
7. SOLAR PANEL INTERCONNECTION SYSTEM, U.S. Patent Application 20190019908, Jan. 17, 2019, Kind Code A1, LEKX; David John, et al, Jan. 17, 2019.

REFERENCE CITED

1. A MICRO POWER MANAGEMENT SYSTEM AND MAXIMUM OUTPUT POWER CONTROL FOR SOLAR ENERGY HARVEST APPLICATION_IEEE ISLPED, pp. 298-303, August 2007, ACM New York, USA, by Shao et al.

FIELD OF THIS INVENTION

The present invention relates to a solar power supply system with a rechargeable solar energy storage battery or a battery bank with battery management system (BMS) or without BMS, for the power supply to an off-grid solar system with an off-grid inverter, or a hybrid off-grid system with automatic transfer switch. The efficiency of a solar array is maximized by connecting the split wire (PVs) from a solar array to a solar charge maximizing controller (or maximizer) to power the DC load directly and to charge a battery or a battery bank at the same time. The present invention can also be used in grid-tie systems and even solar power plants at all different capacity levels.

BACKGROUND ARTS

As a conventional art, the maximum power point tracking (MPPT) solar charge controller is far more efficient than the Pulse Width Modulated (PWM) solar charge controller. Both MPPT and PWM charge controllers are designed for charging conventional flooded or sealed lead-acid, GEL, absorbent glass mat (AGM) solar storage batteries. They have both been designed mainly for controlled charging to extend the battery service life, and to minimize battery gassing, but not to maximize the charging current according to the available energy from a solar array. Some of the MPPT solar charge controllers may also be used to charge a lithium-ion battery, but they all have limited charging current capacity.

In terms of load carrying capacity, both MPPT and PWM charge controllers are generally not designed to allow the battery (or battery bank) charging while the large load is connected to the system. The high direct current (DC) drawn from the system may cause the charge controller to limit the charging current to "protect" the battery and end up wasting the available solar energy as a result. The ever-changing (fluctuating) current draw, sometimes can be as high as 100 or 200 amps or even 400 amps current draw or as low as a few amps, is very common in an off-grid or a hybrid solar energy system. However, a conventional MPPT or PWM solar charge controller may allow a direct DC load connection of maximum 5 amps or 10 amps or 20 amps only.

Both MPPT and PWM solar charge controllers' capacity are limited to have about maximum 100 amps charging current. Higher charging current can cause significant overheating of the MOSFET or JFET or CMOS or other transistors inside the MPPT or PWM solar charge controllers. Majority of the solar charge controllers will have to run interior cooling fan(s) to lower the components' temperature to prevent its components from overheating whenever the charging current reaches 20 amps and over, even for the controllers that consist of a large chunk of aluminum heat sink. The cooling process results in wasting energy and making a lot of fan noise. Some of 60 amps solar charge controllers will have its cooling fan kicked in at 1 amps charging current for extending the service life of the charge controller. Others would just lower the charging current for self-protection, despite the maximum solar conditions available.

In a multiple MPPT charge controllers' system, the total charging amperage may be increased. However, it is almost impossible for all the MPPT controllers to work at maximum power point at the same time. As one of the MPPT controllers scan through different operating points to find the maximum power point on a nice sunny day with maximum solar radiation conditions, other charge controllers will lose the tracking of the maximum solar conditions.

Furthermore, A MPPT charge controller works better during a cloudy day with minimum and consistent solar radiation conditions, when the maximum power point can be easily tracked. And it does offer some advantages for accepting higher voltage input to save the wiring cost for a solar array. But as soon as the sun is shining, the amount of solar radiation reaching the earth's surface varies greatly because of changing atmospheric conditions and the position of the sun, both during the day and throughout the year. The partial shading on a single solar panel will have a significant impact on the whole string that is connected in series.

The traditional MPPT solar charge system has the solar panels connected in series, and it may also include many parallel strings with the same nominal voltage of panels in series. A typical residential or light commercial off-grid MPPT solar charging system may include 10~30 panels with about 300 watts capacity each, for a total of 3000 watts to 9000 watts, or even more capacity. It is nearly impossible for an MPPT charge controller system to ensure every solar panel operates at maximum power points, especially in high solar radiation conditions.

The previous art, PHOTOVOLTAIC POWER REGULATION SYSTEM_CA 1226895, CPC 320/11, IPC H02J 7/00 (2006.01), HO2J 7/35 (2006.01), Sep. 15, 1987 by Jaster, Dale R, relates to an apparatus for controlling the charge rate and voltage of storage batteries of a solar power generating system using a single voltage regulator module to monitor and control the state of charge of any number of cells of a battery and a number of solar modules. It is related to charging control, but it is not related to maximizing the charge current from a solar array.

The previous art, SOLAR POWERED DC LOAD SYSTEM_CA 02762531, IPC HO2J 7/00 (2006.1), H01L 25/00 (2006.01), Jan. 6, 2012, by Carroll, Min, does relate to solar panel with battery and DC load. But the DC load is limited to powering a water pump and an illumination system. It also involves the load control to turn on/off the LED lights automatically during the day.

The previous art, PHOTOVOLTAIC POWER STATION_U.S. Pat. No. 10,381,840 B2, Aug. 13, 2019, BY Shuy et al. teaches us that a solar power station power supply is maximized by providing an energy reservoir in a grid-tie system to supply power to the grid. This art teaches us about the "Maximum Energy Utilization Point tracker" (MEUPT) Optimizer to capture the out of phase surplus energy through the use of an energy reservoir and use the captured energy to provide power in a grid-tie system through synchronization with power grid in a power station with a capacity in the Mega Watt (MW) level. This art does not relate to an off-grid system with an off-grid inverter within the 45 Kilowatts (KW) range.

In another previous reference publication, A MICRO POWER MANAGEMENT SYSTEM AND MAXIMUM OUTPUT POWER CONTROL FOR SOLAR ENERGY HARVEST APPLICATION_IEEE ISLPED, pp. 298-303, August 2007, ACM New York, USA, by Shao et al., teaches us the light energy harvesting applications through an inductor-less on-chip micro power management system. The system targets a wide variety of applications that operate at different lighting environments ranging from strong sunlight to dim indoor lighting where the output voltage from the photovoltaic cells is low. The system has a step-up charge pump that is used to directly operate the circuit or to charge a rechargeable battery. A low power circuit design is proposed for the implementation of the system maximum output power control through the implementation of a 0.35-mum CMOS process. This reference does address the "charge pump" used for directly operating a DC circuit. But it is generally limited to limited current control in the solar cell level. The amperage range is nowhere near the solar panels level with a few hundred amps in an off-grid solar power supply system.

In the other previous art, SOLAR POWER MANAGEMENT SYSTEM_U.S. Pat. No. 8,258,741 B2, Sep. 4, 2012, by Wu et al, teaches us that a solar power management system is provided for managing electric energy conversion by a photovoltaic cell module, supplying the converted electric energy to an external load, and storing the converted electric energy in a battery. The solar power management system comprises a multiphase maximum power tracking (MPT) module, a charging circuit and a voltage conversion module. The multiphase MPT module regulates output current of the photovoltaic cell module to output maximum power within the high limit thereof and obtain improved solar energy conversion efficiency. The voltage conversion module converts the electric energy generated by the photovoltaic cell module into different voltage formats, such as 5.6V DC, 1.0V DC, 0.6.about.0.3V DC low voltage, or −1.2V DC negative voltage, to meet different external load requirements. The solar power management system has simple circuitry and can be configured as a System on Chip (SoC) at reduced cost while providing very wide applications. The application of this art is also limited to micro power supply systems. It relates to solar cells level with low DC voltage and current. It does not relate to the solar panel level in the application of an off-grid or an off-grid hybrid system.

There is another art, ADAPTABLE RECHARGING AND LIGHTING STATION AND METHOD OF USING THE SAME, U.S. Pat. No. 10,014,683, by Ellenberger et al, Jul. 3, 2018. It does relate to a self-contained rechargeable power system, whether there is a power grid or no grid at all. But it is mainly related to different types of batteries with solar array to power light emitters and/or exterior electronic devices through a charge port. It relates to a customizable system that may include one or more lamps and one or more charging ports for external electronic devices that utilize solar and/or battery power. The system also has limited power capacity. And it does not address the maximum power capacity required for a complete off-grid system, in the case of a cottage or remote area without a power grid at all.

The art, SOLAR PANEL INTERCONNECTION SYSTEM, United States Patent Application 20190019908 Kind Code A1 LEKX, David John, et al, Jan. 17, 2019. It relates to a back sheet for a solar panel assembly.

There is also art, SOLAR POWER STORAGE MODULE AND SYSTEM AND SOLAR POWER SUPPLY SYSTEM, U.S. Pat. No. 9,082,897 B2, by Liu et al, Jul. 14, 2015. The system does have a capacity to maximize the power supply capacity. But it does not relate to an off-grid system with a battery or a battery bank.

There are numerous arts and products that have been developed in recent years for a grid-tie system to have the solar energy generated by a large-scale solar array directly sent to the grid through a grid-tie inverter or many micro-inverters. The system may also include a large capacity lithium-ion based solar energy storage battery or battery bank to store energy in case the grid is down. It may also include sophisticated, web-based power management systems for remote control. A typical such system is the TESLA POWERWALL system with 13.5 KWH lithium-ion battery and an integrated grid-tic inverter. The 13.5 KWH POWERWALL system will support 5 KW continuous power drawn from the lithium-ion battery with liquid thermal control. However, the lithium-ion battery in the POWERWALL system is charged by the AC power. When the grid is down for more than a few days, the system will also be down, because the battery is not designed to be directly charged by the solar array in this type of system.

As a matter of fact, the application of a grid-tie system with a so-called "net metering" program to the local utility company is not an easy task. There are many stakeholders involved, such as energy retailers, consumers, generators, distributors, service contractors, installation contractors, inspectors, local utility companies and local government, etc. . . . The law and regulations are also ever-changing. The application process is a daunting task for a regular home or small business owner. For a micro-generation facilities 10 KW and under in Canada, the inverter-based unit must still follow the rule of "no more than 0.5% DC injection to the grid" and "harmonic levels must be maintained below CAN/CSA-C61000-3-6 standard". There are lots more rules to follow in the grid-tic system. Such scale of Micro FIT grid-tie system is generally not feasible, despite the fact that solar panel price has dropped significantly over the years.

In the meantime, the price for lithium-ion batteries has also dropped dramatically. The present invention has just come at the right timing to open up the huge market at the independent home and small building level. The off-grid or hybrid solar system serving residential homes or small buildings can cut the owners utility bills by 30% to 100%. The level of reduction depends on the total electricity consumption, daytime electricity consumption, and total capacity of the battery bank and the number of solar panels installed. There is no critical requirement for an off-grid inverter, even a modified sine wave inverter may be used to power non-critical & non-inductor load, such as a stove for cooking. In the case of a hybrid off-grid system, a pure sine wave inverter may even be used to power personal computers. And a 5.0 KW automatic transfer switch (ATS) may switch the power source between utility grid and the inverter in 10 to 16 MS (mini-seconds) without interrupting or resetting the operating personal computer(s) with no UPS_uninterruptible power supply attached to it. A solar charge maximizing controller in the present invention can boost the 100 amps capacity limit of an MPPT system up to a maximum 300 amps with minimum extra cost. A solar charge maximizing controller system with 300 amps capacity in a 24V nominal voltage system (or 150 amps capacity in a 48V nominal voltage system) can support up to 7.2 KW of total capacity from solar panels.

SUMMARY OF THIS INVENTION

Present technical problems are listed below.

1. The implementation of a traditional grid-tie solar system with a few kilowatts up to 20 kilowatts capacity, at individual homes or small buildings with limited available roof area or small land, is generally not feasible due to complicated application process, and ever-changing rules and regulations. There are too many obstacles in the net metering program across the world, despite the advantage of cost saving for a solar system without an energy storage battery or a battery bank. There are also many restricted technical requirements for a grid-tie inverter and a net meter. The home or business owner must become an energy generator, as soon as the grid-tie system is connected. This is a daunting task for a regular home or small business owner. There have been numerous reports about the application process delay. Some homeowners have spent over $60,000.00 dollars to have the solar panels installed, but just sit idling for the grid-tie approval. Others may have the grid-tie built, but the distributor could appeal to the court to have the price reduced for any power coming out from the meter to the grid anytime in the future. On the other hand, the energy distributor must ensure the pure sine wave power source in the whole power grid. Too many small generators in the grid will for sure cause harmonic levels issues, or higher DC content in the grid, and further compromise the power quality for all other customers in the same grid.

2. There are some grid-tie systems with solar energy storage capacity. But there is no exception for such a system in the grid-tie application approval process. Furthermore, such a system still needs the AC power from the grid to charge the battery. When the grid is down, the system will also be down after the energy in the battery is depleted.

3. The traditional on/off solar battery charging method has been taken over by PWM and MPPT solar charge controllers. The MPPT solar charge controllers do offer some advantages for accepting higher and flexible solar power input voltage. The MPPT solar charge controller will also work well at steady solar radiation conditions. The MPPT solar charge controller will also adapt to different battery voltages. However, the MPPT solar has been designed to charge and protect GEL battery, sealed and flooded lead acid battery and AGM battery. The high current drawn from an off-grid or a hybrid system will generally cause these types of charge controllers to limit the current output to "protect" the battery, and end up wasting the available solar energy from a solar array.

4. The traditional lead acid, GEL, AGM solar energy storage batteries, in the off-grid systems, have been gradually replaced by lithium-ion based batteries, such as lithium-ion phosphate (LiFcPo4) batteries. Lithium-ion based batteries do not need the same protection as traditional batteries. The lithium-ion based batteries always have their own battery management system (BMS), it is always preferred to have maximum charging current as long as the charge current is below the maximum charge current allowed for the lithium-ion battery or battery bank. Some of the MPPT solar charge controllers do allow the users to set it up for lithium-ion battery charging, but the charge current is generally limited to 100 amps maximum. A 100 amps MPPT solar charge controller may actually only handle a maximum of 50 amps of continuous charging current. The overheating of electrical components in the MPPT solar charge controllers may be controlled by adding a large heat sink or integrating a cooling fan in the system. But the charging current capacity is always below the minimum required for an off-grid solar power system of a normal residential home. Furthermore, the MPPT solar charge controller will have to waste a significant amount of energy to scan through a set of different operating points to find the maximum operating points, especially when the solar radiation changes rapidly at maximum solar conditions. A high current capacity MPPT solar charge controller is also very expensive.

5. It is preferred to have the panels connected in series for maximum voltage input in an MPPT solar controller system to save the wiring cost, but shading on any single panel in a string with its panels connected in series will always have a significant impact on the output of the whole string of the solar panels. While solar radiation conditions in a solar array located in the urban area is ever-changing due to the shading from tree and building structure, or solar panel orientation. The birds flying over a solar array can cause the energy output of an MPPT solar charge controller system to drop dramatically.

6. There are similar situations in the string inverter in grid-tie systems without any battery storage. The string grid-tie inverters come with MPPT technologies built in the inverters to accept over 1000V or even 1500V voltage from the string with all panels connected in series. These kinds of inverters are generally not efficient in response to the rapid varying solar condition changes, especially when there is partial cloud covering a certain number of the solar panels.

7. There are also micro-inverters, or power optimizers systems used for large-scale grid-tie solar generator applications in recent years. They are more efficient than string inverters, but they do not track the maximum solar condition so well. The inverters in micro scale are more likely to inject more DC content to the grid. Most importantly, there are a lot of small sensitive electronic devices located next to the solar panels without any climate control. Maintenance cost is high. And there are numerous reports about catching fires of these types of devices on the roof recently. When thinking about so many small devices all over the place on the roof, one shall have no problem understanding why there is so much risk.

Solution to the Problems

In a solar charge maximizing controller system according to the present invention, the optimum battery charging operating point is actually maintained by the battery or battery bank with the same nominal voltage of the solar panel's nominal voltage. The split wire from a string with solar panels connected in series can be used to charge the battery or battery bank and to power the DC load (inverter) directly. An automatic transfer switch in a hybrid off-grid system or a hybrid grid-tie inverter can always be set at a range, so that the battery voltage matches the optimum operating voltage of the split wire voltage from a solar array.

In a solar charge maximizing controller system, an MPPT solar charge controller can still be installed to charge the same battery or battery bank at the same time in the same system. The benefit of an MPPT solar charge controller is not compromised, while the mechanical contact switch in the solar charge maximizing controller can increase the charging current capacity significantly without any other system components overheating. The staged contact switch design will ensure much higher charging current available at maximum solar radiation conditions, and yet consume minimum power for the solar charge maximizing controller to charge the battery at minimum solar radiation conditions.

A solar charge maximizing controller system with an automatic transfer switch and an off-grid inverter can be implemented for individual homes and small businesses with limited available roof or land area for solar panels, without grid-tie system approval from a local utility company or an energy distributor. The system would only generate enough electrical energy for the owner's own use, without affecting any other customers on the grid. The solar charge maximizing controller system owner may ensure the self-sufficient power supply by increasing the battery storage capacity and install the maximum number of the solar panels that are possibly allowed in their own facilities. The hybrid system design with automatic transfer switch will ensure the power supply within the home or facility even when there is no solar energy available for a long period of time. With many small solar maximizing controller systems behind the meters in the individual homes and small buildings in the whole region, the maximum demand for the local power grid will drop dramatically. As a result, the same grid will support more customers without upgrading the existing grid infrastructure. And most importantly, the hybrid off-grid systems will not compromise the power quality of the grid. A solar charge maximizing controller can still work in the hybrid grid-tie system. The battery in the system will serve as a buffer storage battery. And the battery capacity can be reduced by feeding excessive power to the grid through a hybrid grid-tie inverter, when excessive energy could not be used within the facility. However, such hybrid grid-tie systems will still need grid-tie approval from the energy distributor or utility company.

The solar charge maximizing controller system is especially useful for homes, businesses and buildings with high daytime electrical power consumptions. In such systems, the more daytime electrical consumption, the less capacity of the battery or battery bank will be required, and the more significant reduction to the local electrical grid power demand can be achieved. A solar charge maximizing controller system with battery, inverter and automatic transfer switch can be customized to serve specific circuit(s) with higher daytime load demand. It can also be customized to serve dedicated circuits with critical load in those circuits. The system is very flexible, there is no need to have the whole house or whole building go off-grid. Most importantly, the present invention can reduce the power demand from a local grid significantly during the peak hours when the present invention will be applied to the majority of customers on the grid. And the existing grid infrastructure can support more customers and urban development without the need for major upgrades to the grid infrastructure.

The numeral testing results by comparison between an MPPT solar charge controller and a solar charge maximizing controller have proved that a solar charge maximizing controller will outperform many MPPT solar charge controllers, based on the system with the same solar panels. The effective charging current has been compared. MPPT solar charge controllers from many famous manufactures with all ranges of current capacities have been tested. They are compared in all solar radiation conditions, from charging at high solar radiation conditions to moon-light charging. Surprisingly, a solar charge maximizing controller would outperform many of the MPPT charge controllers even in the moon-light charging conditions, and during a cloudy day. The testing has been conducted by clamping the charging current to the same lithium-ion phosphate (LiFePo4) battery bank.

It is the contractor, installation technician or system designer's responsibility to ensure that the split wire has the same nominal voltage as the battery or battery bank's nominal voltage in the system. Take the 24V lithium-ion phosphate (LiFePo4) battery system as an example, the 60-cell solar panel would have an optimum operating voltage of 31.0V (Vmp=31.0V) at standard test condition (STC25C). While a 24V automatic transfer switch (ATS) serving the 24V lithium-ion phosphate battery can be set to use the grid power when battery voltage falls down below 25.0V, and use the battery power when the battery voltage reaches 28.0V. This would be the perfect range for a 24V lithium-ion phosphate battery or battery bank. At this setting range for the ATS, the relay in the ATS is not likely to enter into a short cycling (constantly on/off) state, as long as the battery capacity is sized properly, since a 24V lithium-ion battery would normally have a fully charged voltage of 26.8V. At 28.0V charging voltage, the LiFePo4 battery would already have sufficient capacity to prevent the voltage falling below 26V should the ATS kicks in to use the battery power. The cell number may be increased to 72 cells in the hot climate regions or zones. The "Vmp" may fall below 28.0V for a 60 cell panel when its temperature reaches 60° C. degree. The 24V lithium-ion battery would normally accept a charging voltage of maximum 29.2 voltage, and cut off the power supply when the voltage falls below 20.0 or 22.0v. In 24V nominal voltage system, an off-grid inverter has an operating voltage range between 22.0V and 30.0V. The inverter will generally set off alarm when the voltage falls below 23.0V. A solar charge maximizing Controller shall normally be set at 26.8 to start charging a lithium-ion battery or battery bank, and to stop charging when the voltage reaches 28.8V. This would be the appropriate range to maximize solar energy harvesting automatically. However, the field technician, or system designer must ensure that the battery bank's maximum charging current is sufficient to accept the maximum current from a solar array. If the battery bank charging current capacity was too lower, the charging voltage would be constantly reaching over 29.0v to cause the solar charge maximizing Controller to stop charging, or the BMS in the lithium-ion battery will prevent the charging to protect the battery. The result would be wasting the available solar energy. All the voltage numbers listed above is for the nominal 24V lithium-ion battery and battery bank with BMS. The voltage and cell number shall be reduced to half if it is a nominal 12V solar system, and doubled if it is a nominal 48v solar system.

In the case of other types of energy storage battery, such as lead acid, GEL, or AGM battery, the "stop" charge voltage value in the solar charge maximizing Controller must be set at a voltage below the floating charge voltage by the field technician. The battery manufacturer will always provide the floating charging voltage value for the specific type of battery. When the solar charge maximizing Controller is not charging the battery, the MPPT solar charge controller will still be charging the battery to top it off. Because the solar energy from all the solar panels is still available to the MPPT solar charge controller when the solar charge maximizing Controller stops charging according to the present invention.

It is the contractor, field technician or the system designer's responsibility to make sure the system will include other components, such as combiner boxes, DC circuits breakers, disconnects and system grounding as per local electrical standards and codes. The current limit for each of the components and wiring shall all be lower than the maximum current limit allowed according to the local electrical standards and the codes.

The potential application opportunity of present invention in the large-scale of grid-tie systems, such as solar generator stations over commercial buildings and solar plants, is also enormous. The solar charge maximizing Controller system will surely outperform the string inverter system, since it is less likely to be affected by the changing solar conditions. It will also solve the high maintenance cost, and unreliable components issues that have become very common in the micro-inverter and optimizer systems in recent years. All the solar charge maximizing controller system components including the lithium-ion batteries or battery banks can be located in the electrical rooms or hydro vaults to ensure reliability, and serviceable throughout the years.

DESCRIPTION OF DRAWINGS AND EMBODIMENT

FIG. 1 illustrates a typical solar array arrangement for a solar power system exemplary embodiment with solar charge maximizer (or maximizing controller) 100. The high voltage wire 105 from the panels connected in series to charge the battery or battery bank 108 through the traditional MPPT solar charge controller 107. This is a common negative system with the common negative solar charge maximizer (or maximizing controller) 100 works in conjunction with a common negative MPPT solar charge controller 107 to charge the same battery or battery bank 108 in the system, and to power an off-grid inverter 109 directly. The off-grid inverter 109 supplies the AC power to an automatic transfer switch that can be set to transfer power source between the solar energy and another power source, such as grid power or another power generator. The voltage setting on the automatic transfer switch can be set at the optimum range for the solar charge maximizer to charge the battery 108. The solar panels 102 with the same nominal voltage as the battery 108 are connected in parallel. The split wire 104 from the common panel 103 also has the same nominal voltage of the battery or battery bank 108. The split wire is connected to the positive terminal of all other panels 102 connected in parallel. The split wire (PVs) charges the battery or battery bank 108 through the solar charge maximizer 100. The large portion of the charging current is conducted through the mechanical contact switch (or switches) inside the solar charge maximizer 100, so that the MPPT solar charge controller 107 does not need to handle high charging current. The components overheating in the MPPT solar charge controller is minimized. And the solar energy harvesting and utilization for the whole solar array is maximized. The split wire connection 104 with solar panels connected in the combination of series and parallel and the solar charge maximizer 100 are the exemplary embodiment of the present invention.

Figure 2:
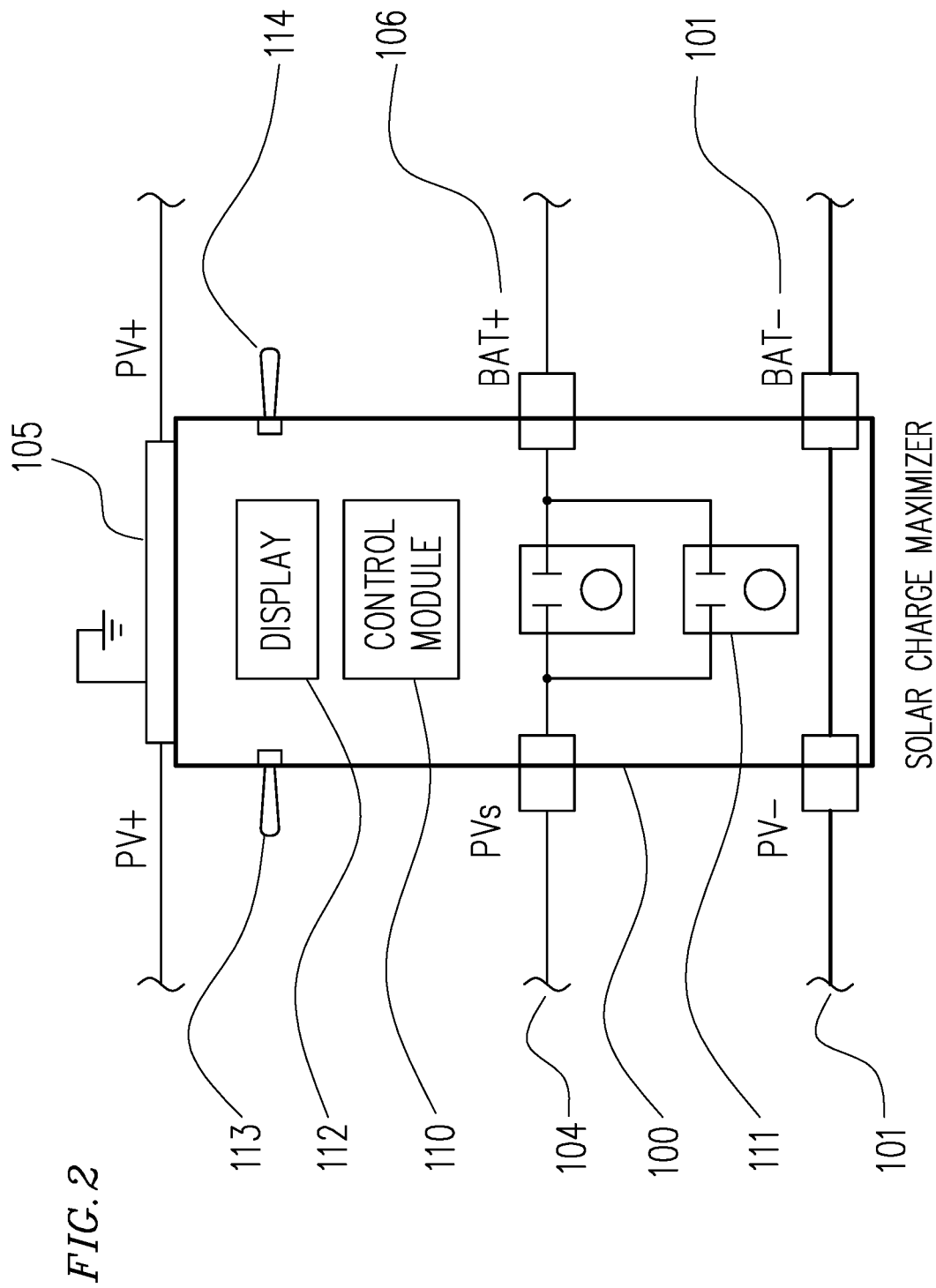

FIG. 2 is a configuration diagram of a common negative solar charge maximizer 100, according to the exemplary embodiment of the present invention. The negative terminal 101 is connected directly to the battery or battery bank negative terminal. The negative terminal passing through the solar charge maximizer 100 may be connected to an electrical shunt or a Hall-Effect current sensor for charging current monitoring and display. The control module 110 has the terminals for split wire voltage signal connection. The control module 110 has a "start" button and a "stop" button that are pre-set in the factory for lithium-ion phosphate battery charging. It also allows the users to change "start" and "stop" charging voltage setting values on site. The control module 110 will send electrical power to the control relay 111 to close the relay contact for direct charging. The control module 110 may also be connected to a current or temperature sensor to activate the second relay, or even third or fourth relay to close the switches in stages to maximize the charge current at maximum solar radiation condition. The first stage relay can be sized according to the minimum solar radiation condition, so minimum current is needed to pull the first contact switch. All the contact switch (or switches) shall be opened when the battery voltage, as well as the split wire voltage will reach the preset stop charging value. The control module 110 may be connected to the display module 112 to show the battery voltage, split wire voltage, charging current, charging power, and total energy has been charged in watt hours or kilowatt hours. The control switch 114 may turn on or off the solar charge maximizer 100. The wakeup switch 113 can be turned on to wake up a lithium-ion battery or a battery bank with BMS that had switched off the lithium-ion battery for over-current draw protection. The wakeup switch 113 may also be used to pre-charge an inverter prior to the battery hookup. The LED indicator may be used to indicate the switch conditions. This exemplary embodiment shows a common negative solar charge maximizer. The solar positive wire 105 is not connected to the solar charge maximizer 100. The diagram shows the solar positive wiring 105 bypassing the solar charge maximizer 100, and it is to be connected to a common negative MPPT solar charge controller. A common positive solar charge maximizer would have very similar construction, except for the solar positive terminal would be connected directly, but the split wire 104 from the solar array is still controlled by the relay switches 111 through the control module 110. And the solar negative wire has to bypass the solar charge maximizer, and to be connected to the common positive MPPT solar charge controller.

Figure 3:
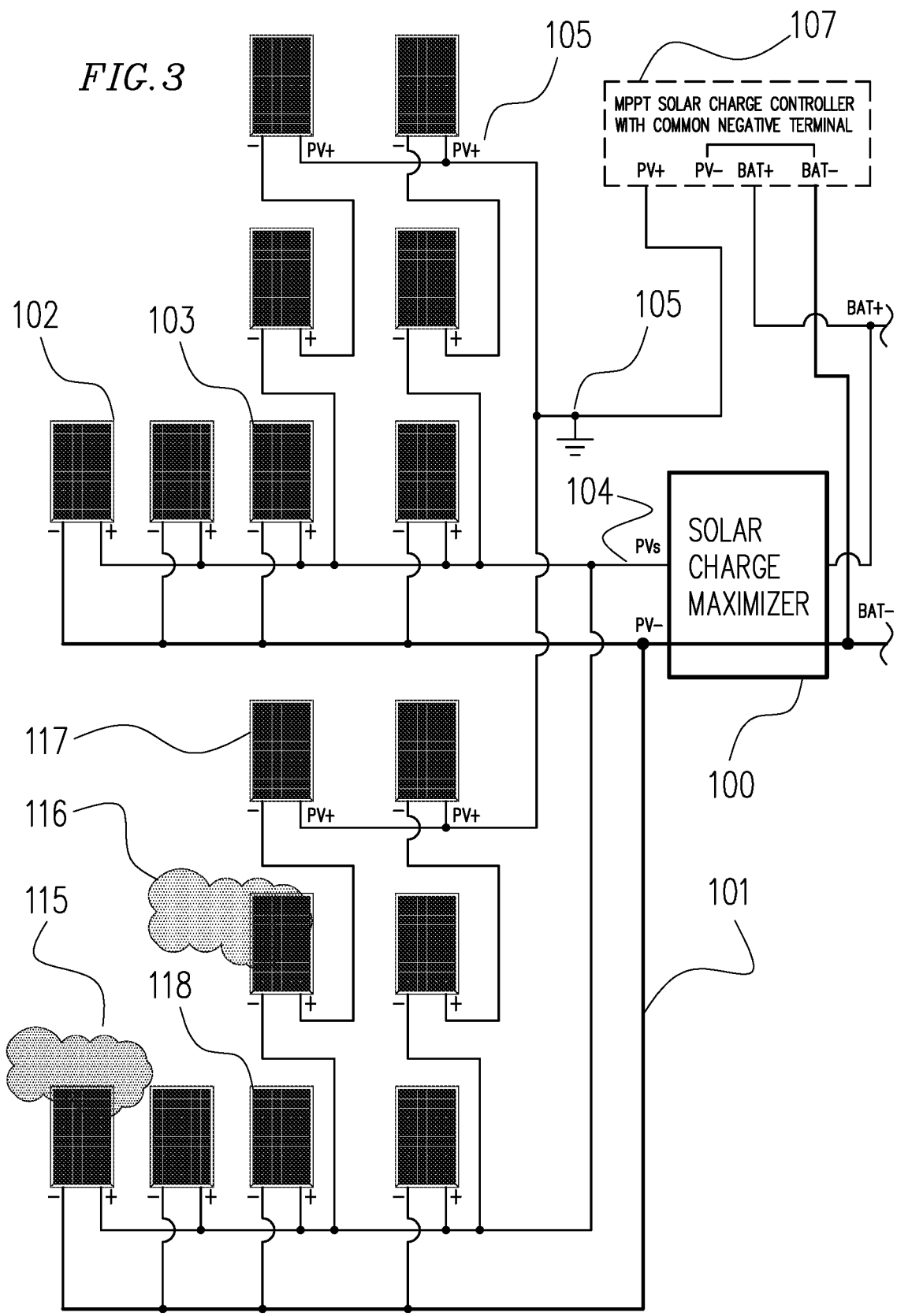

FIG. 3 is a diagram illustrating how a common negative solar charging maximizing controller system can be expanded to further increase the current capacity. In a single common negative MPPT solar charge controller 107 and common negative solar charge maximizer 100 system, another group of solar panels with combination of series and parallel connection can be integrated into the original group with panel 102, as long as their split wire 104 has the same nominal voltage. The same nominal voltage of solar positive wire 105 from panels 117 connected in series can also be connected to the same common negative MPPT solar charge controller 107. This kind of configuration may be implemented in a house or small building with different roof orientations and/or with shading from nearby structure or tree. The shading 115 on any one of the panels 102 connected in parallel will have no impact on the energy output of all other panels in the system. The shading on one of the panels in series 117 will have no impact on the energy output from other strings. There are also common panels 103 in such systems. The solar energy from all common panels 103 is still available for solar charge maximizer 100 with split wire 104 connected to the same port. The solar energy from all common panels 103 is also available for the MPPT solar charge controller 107 connected to the solar positive terminal (PV+).

Figure 4:
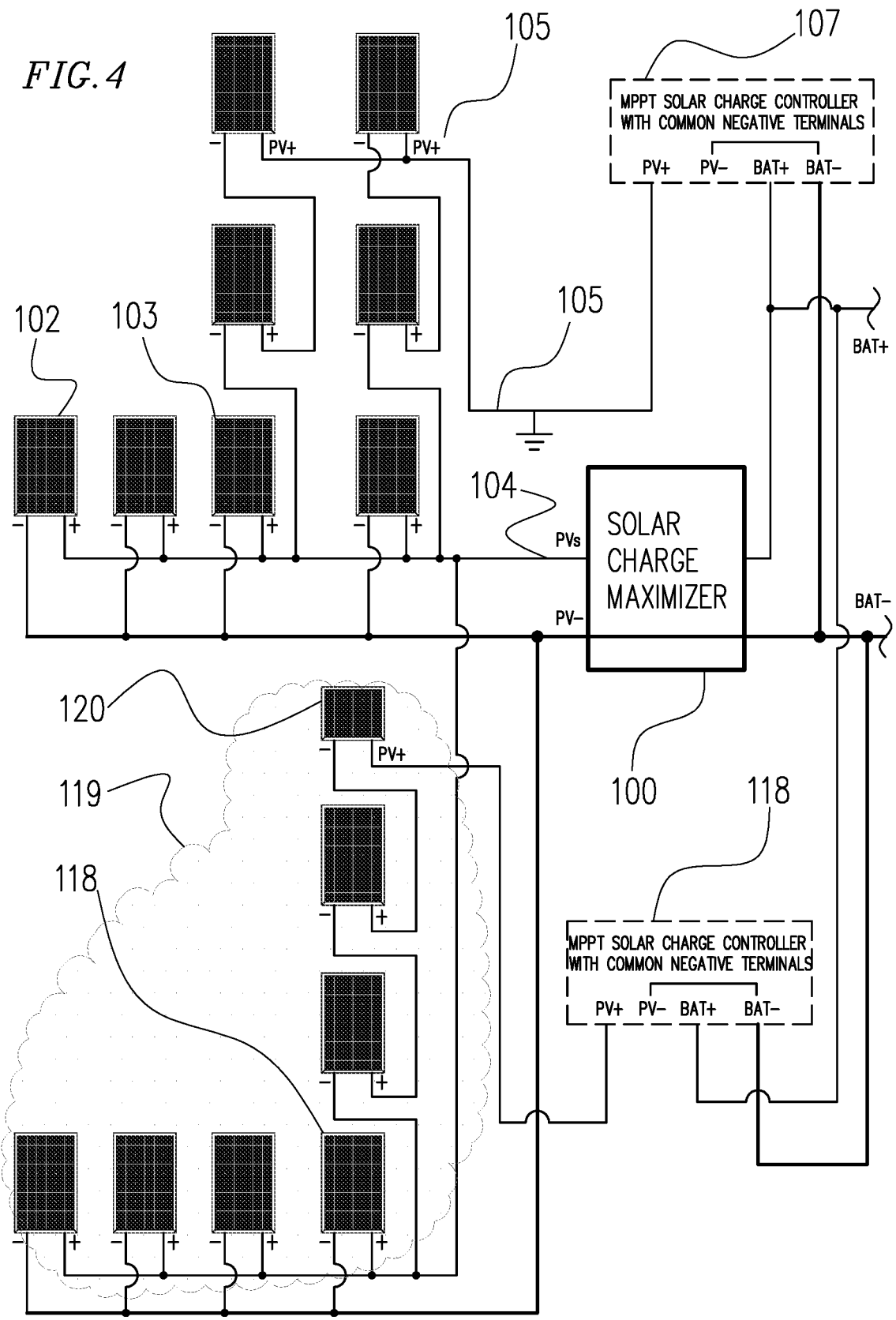
Figure 5:
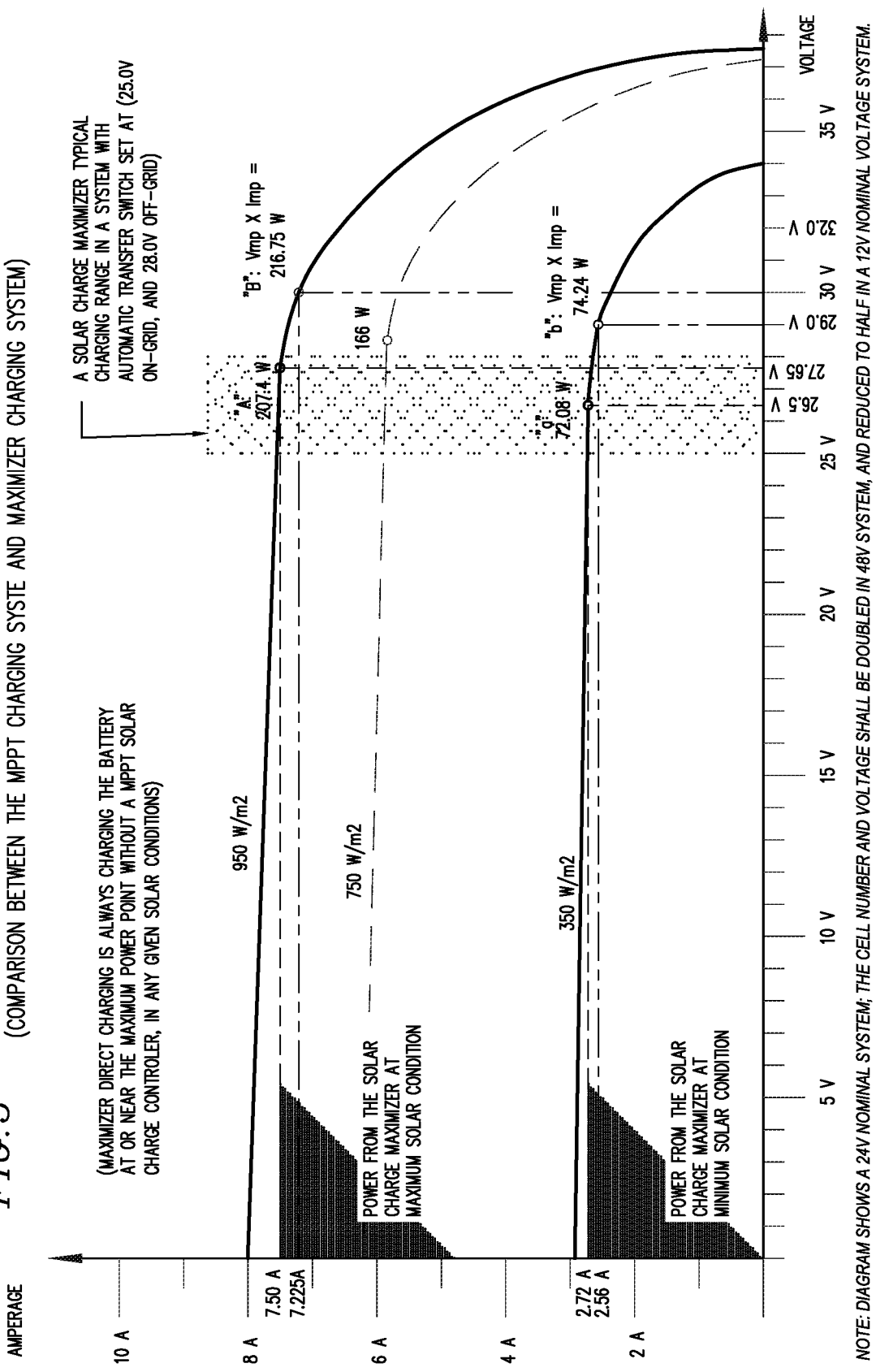

FIG. 4 is another possible system arrangement of an exemplary embodiment according to the present invention. There could be another or even more of the common negative MPPT solar charge controllers 107 in the system charging the same battery or battery bank, along with the common negative solar charge maximizer 100. The other group of solar panels has an extra solar panel 120. The solar photovoltaic voltage PV2+ is different from the PV1+ in the other group. The MPPT solar charge controller in the group 120 may have a higher voltage input than the PV1+ from another group. This kind of configuration may be used for a house or small building with different orientation in each part of the roof. One part of the roof may receive less solar radiation in the morning, and the other part of the roof may receive less solar radiation in the afternoon. The shading 119 may reduce the solar energy output from PV2+ wire, but shading 119 will not affect the performance of the whole group with PV1+ terminal. The split wire 104 with the same nominal voltage can still be connected to the same single solar charge maximizer 100. Because the solar minimum and maximum radiation condition has very little impact on the optimum charging point of a group of solar panels connected in parallel, as illustrated in FIG. 5. Also, every solar panel in the solar maximizer system has a blocking diode according to the present invention.

FIG. 5 illustrates the I-V curves of a typical 60-cell solar panel under standard testing conditions (STC 25C) at varying solar radiation conditions. This diagram proved that the direct mechanical switch contact charging method (on/off charging method) through the split wire, according to present invention is appropriate method in all solar radiation conditions from minimum to maximum, as long as all the panels has the same nominal voltage, and the temperature range is near or below the STC conditions. This method is suitable for charging lithium-ion based batteries without gassing issues. It is also good for charging other types of battery, such as GEL, AGM and Lead acid batteries, as long as the "stop" charge voltage value is set below the floating charge voltage required by the battery manufacturers, according to the present invention. It is appropriate for the panels in parallel serving split wire circuitry to have 72 cells for a 24V nominal voltage system when the panels are installed in a hot climate region. Through the voltage control of an automatic transfer switch in the system, the battery voltage can always be maintained between 25.0v and 28.0v_the optimum voltage range for direct charging. Maintaining optimum charging point method will eliminate the fluctuating current output as it would normally be seen in an MPPT solar charge controller system. In the meantime, the cost for a high current MPPT solar charge controller is not required. Also, the overheating in the MPPT solar charge controller components can be prevented. In a 12V nominal voltage system, the cell number and voltage value illustrated here would be reduced to half. In a 48V nominal voltage system, the cell number and voltage value illustrated here would be doubled.

Figure 6:
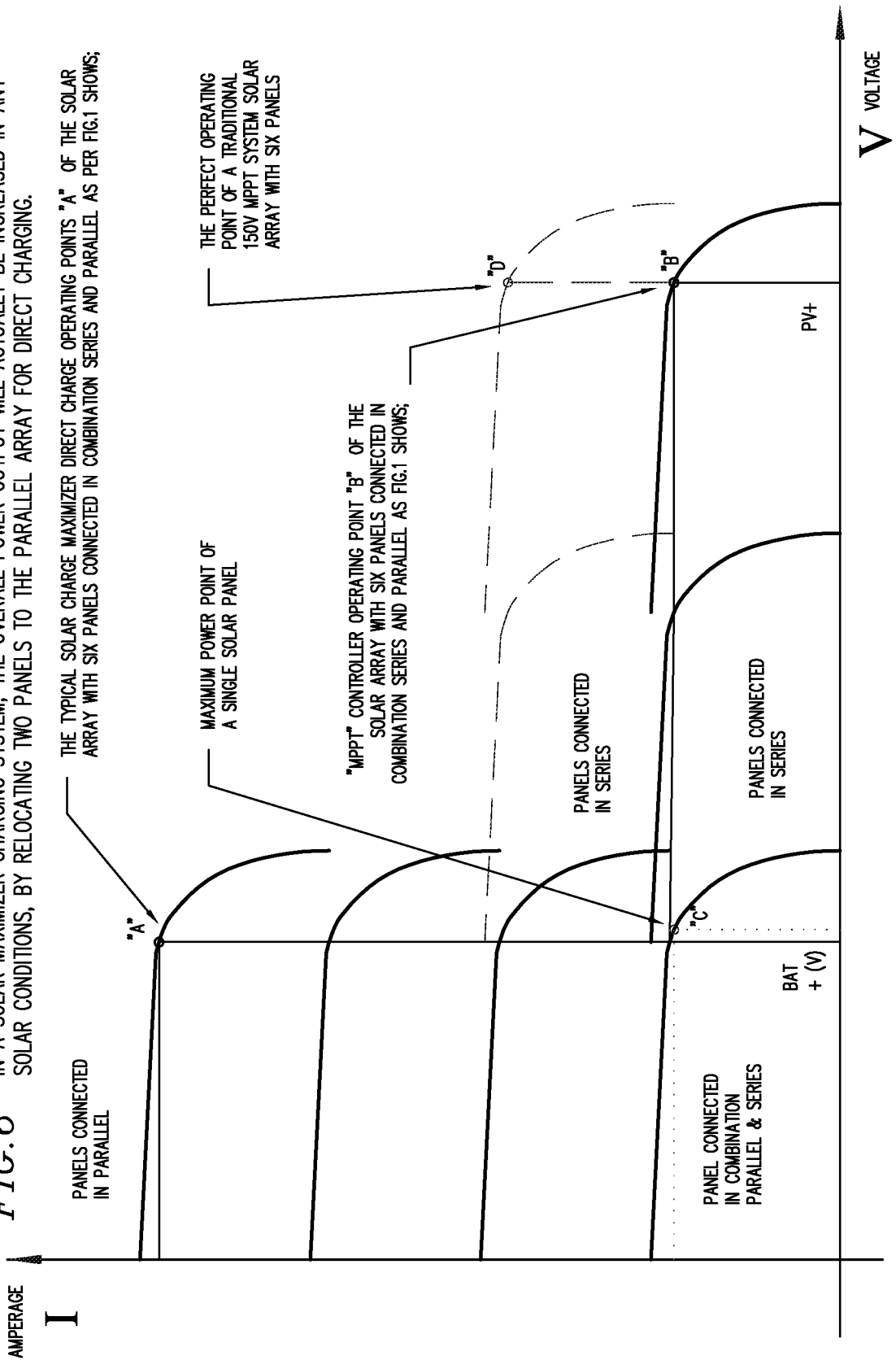

FIG. 6 illustrates how the harvested overall solar energy may be maximized by relocating some of the solar panels in series for an MPPT solar charge controller system to be connected in parallel and charging the battery though the split wire in a solar charge maximizer system, according to the present invention. The total solar energy harvested is maximized for the following reasons:

1. The optimum operating points are maintained for all the solar panels connected in parallel, as compared to an MPPT solar charge controller system where shading on one panel can have dramatic impact on all other panels connected in series.
2. The solar energy harvesting is steady in any given solar radiation condition, as compared to the charging current fluctuation that normally appears in an MPPT solar charge controller system.
3. The current flow through the mechanical contact switch (or switches) may generate minimum heat in any solar conditions, as compared to the significant heat may be generated in an MPPT solar charge controller system, especially at maximum solar conditions.
4. As a matter of fact, the majority of energy of a solar array is harvested at maximum solar radiation conditions. An MPPT solar charge controller can waste a significant amount of energy at maximum solar conditions, when the overheating of its components happens.

Figure 7:
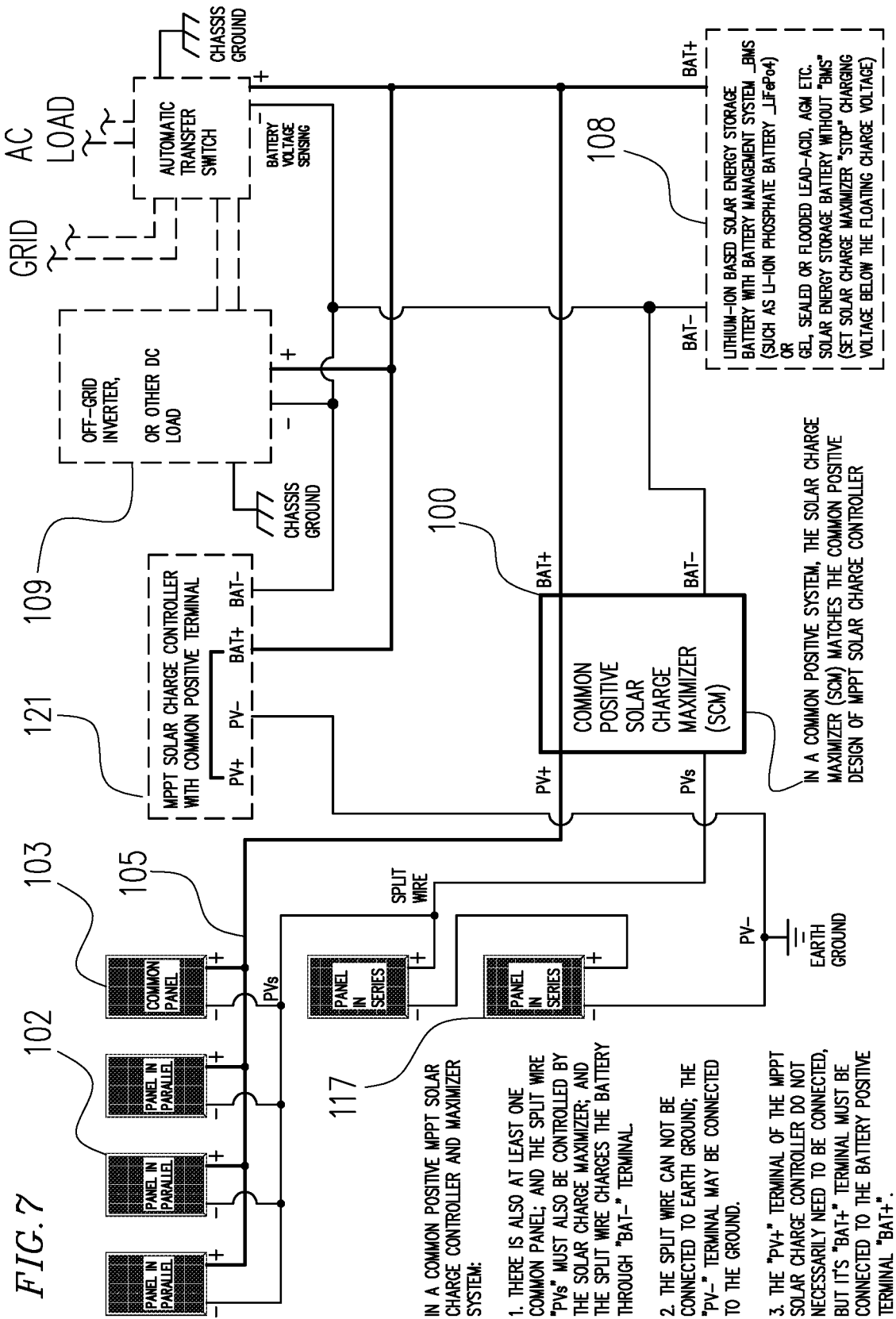

FIG. 7 is a diagram illustrating an exemplary embodiment of a common positive solar charge maximizer system according to the present invention. In a common positive solar charge maximizer system, both MPPT solar charge controller 121 and the solar charge maximizer 100 must be of common positive design. In the common positive solar charge maximizer system, the solar positive wire PV+105 is hard-wired to the battery positive terminal through the solar charge maximizer 100 without any control. If the solar array needs to be grounded, the solar positive and the battery positive terminal shall be grounded. The solar negative is not grounded in a common positive system, and the solar split wire PVs must never be grounded. There are also panels 102 connected in parallel, and panels 117 connected in series in the common positive system. There is also at least one common panel 103 in the system. In a common positive solar charge maximizer system, both common positive MPPT solar charge controller 121 and common positive solar charge maximizer 100 are still charging the same battery or battery bank 108. The battery or battery bank voltage is still maintained by the off-grid inverter and an automatic transfer switch 109. In a common positive system, the PV+ terminal of the MPPT solar charge controller is not necessarily connected.

Figure 8:
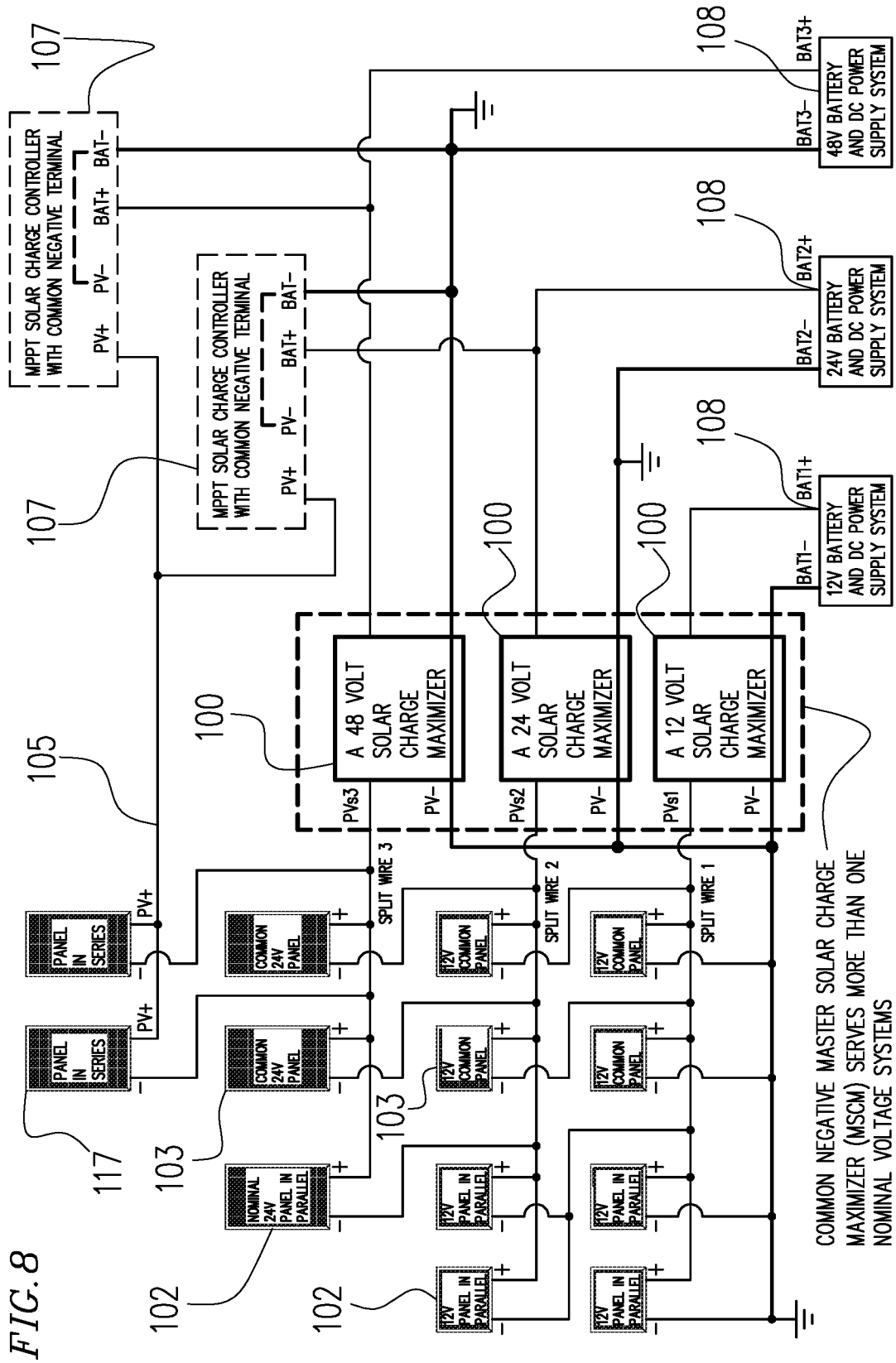

FIG. 8 is a diagram illustrating another exemplary embodiment according to the present invention. Two or three more solar charge maximizers 100 with different nominal voltages can be integrated into one single unit, called master solar charge maximizer (MSCM). The split wires PVs1, PVs2 and PVs3 with the matching nominal voltage of the batteries (BAT1, BAT2 and BAT3) are connected to the corresponding terminals in the master solar charge maximizer. There may be one or more MPPT solar charge controllers 107 in the same system serving corresponding batteries. Batteries 108 with different nominal voltages must not be connected to the same MPPT solar charge controller. Different MPPT solar charge controllers may share the same solar positive terminal PV+, but they must all be of the same common negative design, or same common positive design. The exemplary embodiment in this diagram shows a common negative design. The negative terminals are connected to the earth ground in this system. Alternatively, the solar positive may be connected to the earth ground, but both positive and negative battery terminals must be floating in a master solar charge maximizer system with solar positive ground connection.

Figure 9:
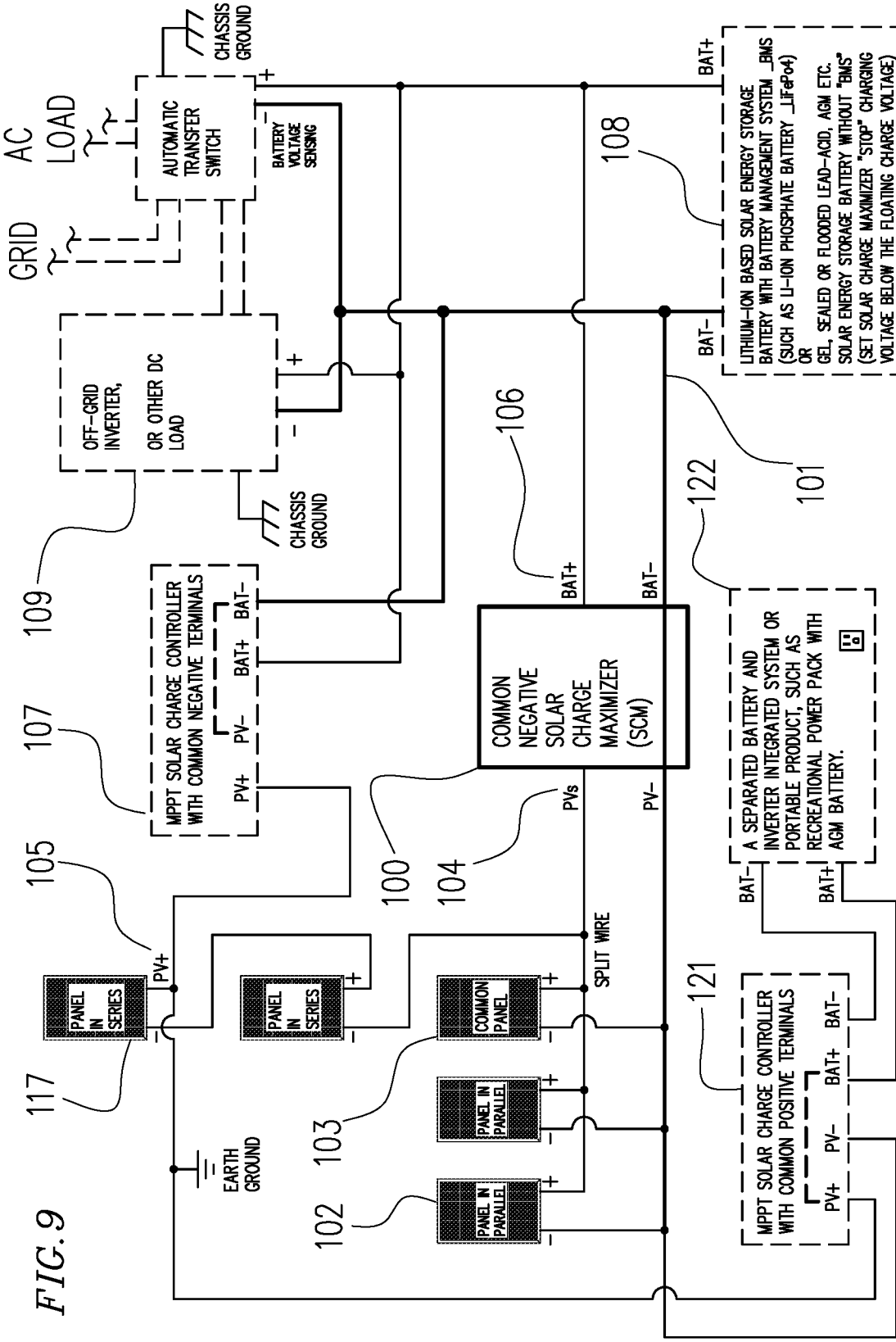

FIG. 9 is a diagram illustrating another application of the exemplary embodiment according to the present invention. The common negative solar charge maximizer system with common negative components 100 and 107 may actually have a common positive MPPT solar charge controller 121 connected to both solar positive PV+ terminal 105 and solar negative PV-terminal 101 of the solar panels 117 connected in series. However, the solar positive MPPT solar charge controller 121 may only be used to charge a separated battery pack 122, normally refers to a portable battery pack with integrated inverter inside, such as a recreation power pack. The battery terminal in such portable pack 122 must not be connected to the solar energy storage battery or battery bank 108 serving the off-grid inverter 109 that has its negative battery terminal connected to the earth ground. The battery terminals of power pack 122 must be floating.

Figure 10:
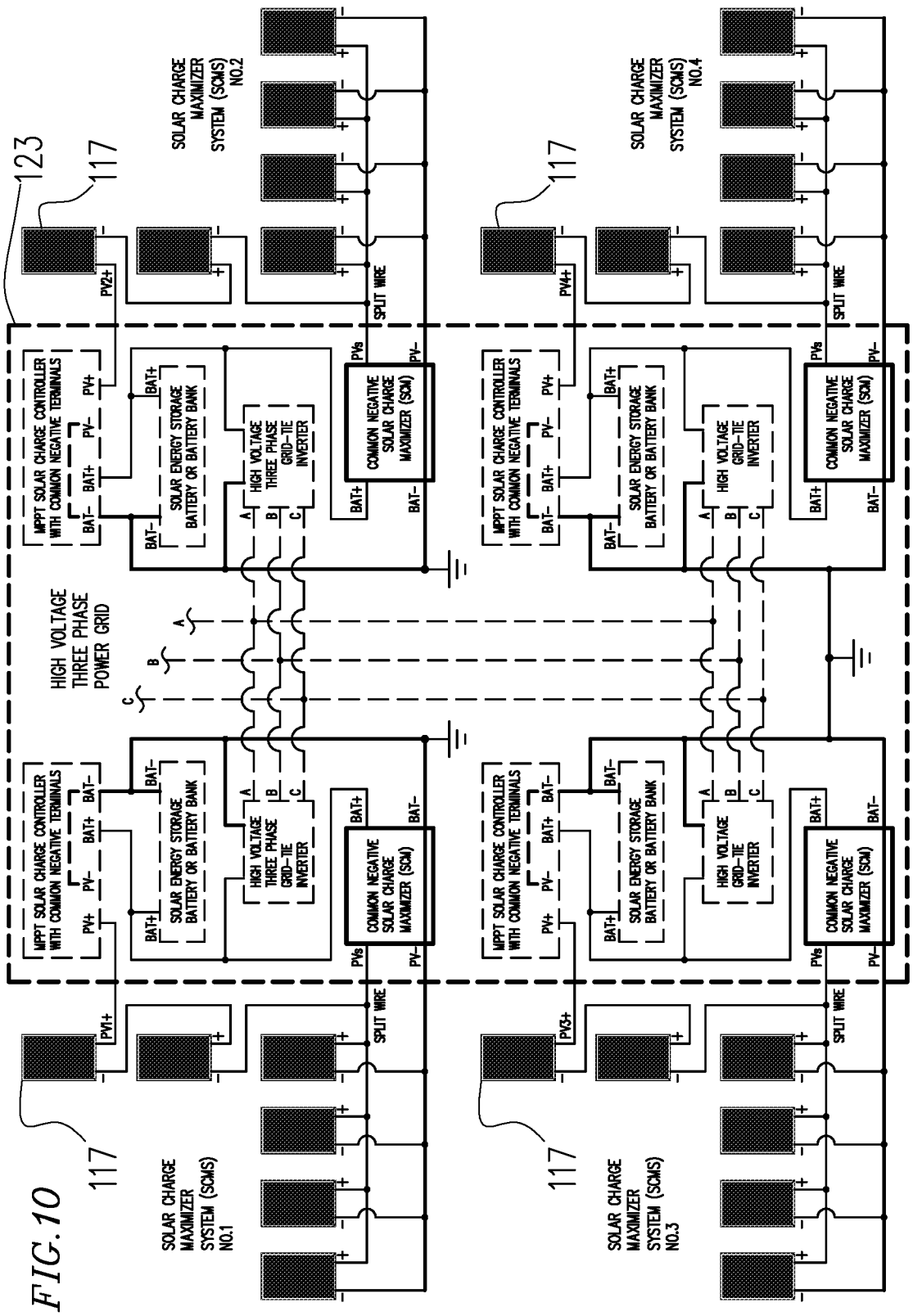

FIG. 10 is a diagram illustrating the large-scale power generating stations or solar farms application of the exemplary embodiment according to claim 1. Each of the solar charge maximizer systems (SCMS) can have a capacity limit of about 300 amps or 400 amps, with its own battery or battery bank and its own three-phase grid-tie inverters. But the overall total capacity can be unlimited. Many solar charge maximizer systems (SCMSs) 123 can be located in the electrical room for large buildings, and in the underground or aboveground hydro vault in case of a solar farm. The diagram shows a common negative system, but it can also be a common positive system as long as the nominal voltage of all solar charge maximizers and the nominal voltage of all MPPT solar charge controllers is consistent. Each solar positive wire connecting PV+ of the MPPT solar charge controller may be different, such as PV1+, PV2+, PV3+ . . . etc. But the battery or battery bank shall have the same nominal voltage as all the panels that are connected in parallel. The nominal voltage may be 12V, 24V, 36V, 48V or 60V, as long as the battery or battery bank, inverter, and solar panels in parallel have the same nominal voltage. The lithium-ion based solar energy storage bank in each solar charge maximizer system maintains the optimum voltage range (25.0 and 28.0 for 24V nominal voltage system) for maximum solar energy harvesting. The three phase inverters can all be set to feed the power to the grid when voltage reaches 28.0V in 24v system and drop off the grid when voltage falls below 25.0V (24.0v system). The inverters in such system can have an optimum capacity range with high quality product to minimize the DC injection and phase shifting to the power grid. And the inverters will not need to operate when the battery voltage falls below 25.0 in a 24v system (50.0V in 48v system). The inverters in such systems will have extended service life with maximum efficiency, because it does not need to run at standby mode. The service life of all other components (lithium-ion battery, solar charge maximizer, MPPT solar charge controllers etc.) will also be extended, because all the components will be located in the electrical room or the hydro vault with proper temperature and ventilation control.

Compared to a high DC voltage (1500V or 1000v) of MPPT string inverters with all panels in series serving PV power plants, or other micro-grid systems serving large commercial and industrial buildings, the solar charge maximizing controller systems still have many advantages. As compared to a 1500V string inverter system, the cloud moving over one panel can have a significant impact on the power output of the whole string. But power output reduction to a solar charge maximizing controller system caused by the same cloud is much less.

The invention claimed is:

1. A photovoltaic power system comprising:
   a first array of photovoltaic panels connected in series generating a first nominal voltage,
   a second array of photovoltaic panels connected in parallel generating a second nominal voltage which is essentially equal with the first nominal voltage,
   a common negative (or common positive) MPPT solar charge controller connected with the first array of photovoltaic panels,
   a solar charge maximizing controller, that matches common negative (or common positive) MPPT solar charge controller, connected with second array of photovoltaic panels,
   a battery bank directly connected with MPPT solar charge controller and with the solar charge maximizing controller, the battery bank having a nominal voltage equal with the first and second nominal voltage,
   wherein the first array, a split-bolt wire(s) {or "spliced wire(s)" } with same nominal voltage as the second array's nominal voltage of photovoltaic panels is (are) also connected to the solar charge maximizing controller, such that the battery bank is simultaneously charged by the first array of photovoltaic panels through MPPT solar charge controller, and in parallel, by the second array of photovoltaic panels through solar charge maximizing controller with the purpose of maximizing the total charge current in ever changing solar radiation conditions.

2. The common negative photovoltaic power system of claim 1, wherein the split-bolt wire(s) {or "spliced wire(s)"} is (are) wired to the positive terminal(s) of photovoltaic panel(s) with same nominal voltage connected in parallel to charge battery or battery bank, and to power the DC load directly through the control of common negative solar charge maximizing controller.

3. The first array in the photovoltaic power system of claim 1, comprising:
   common negative MPPT solar charge controller, matching common negative solar charge maximizing controller, to charge the same nominal voltage battery or battery bank, and power the DC load without interruption from the switching operation of common negative solar charge maximizing controller, or
   common positive MPPT solar charge controller, matching common positive solar charge maximizing controller, to charge the same nominal voltage battery or battery bank, and power the DC load without interruption from the switching operation of common positive solar charge maximizing controller.

4. The second array in the photovoltaic power system of claim 1, wherein the number of the panels connected in parallel does not need to match the number of the panels in series, and the number of the panels in parallel may be increased to minimize the impact from changing solar radiation conditions due to shading and other conditions.

5. The first array in the common negative photovoltaic power system of claim 1, wherein the solar negative terminal (PV−) of a MPPT solar charge controller is not necessarily connected, as long as the MPPT controller is a common negative solar charge controller, and the battery negative terminal of the MPPT solar charge controller is connected to the negative terminal of a solar storage battery or a battery bank that is also charged by the second array with bonded negative terminal through the common negative solar charge maximizing controller with sufficient current capacity.

6. The photovoltaic power system of claim 1, comprising:
a grounded array, wherein either the solar negative terminals (PV−) or the solar positive terminal (PV+) is connected to the earth, but not both at the same time, or
a floating array, wherein neither (PV−) nor (PV+) is connected to the earth.

7. The photovoltaic power system of claim 1,
wherein the split-bolt wire(s) {or "spliced wire(s)"} (PVs) is (are) always connected to a solar charge maximizing controller regardless of common positive design or common negative design, and controlled by the solar charge maximizing controller to supply DC load directly, and/or to charge a battery or a battery bank,
Wherein split-bolt wire(s) {or "spliced wire(s)"} (PVs) is (are) not connected to the ground.

8. The solar charge maximizing controller of claim 1, comprising:
one mechanical relay contact switch, or more relay switches with separated contacts to close the contact(s) in stages according to the maximum current available from the photovoltaic array, to allow the high current passing through a solar charge maximizing controller without components overheating in the solar charge maximizing controller, and/or
one or more PWM (pulse width modulation) controller(s) connecting "PVs" of second array, and
a build-in switch to manually or automatically wake up a lithium-ion battery or battery bank with battery management system (BMS) after the BMS had shut down the battery due to over-current draw or short circuit protection, to pre-charge an inverter or inverters with certain charging current limit prior to the connection of the battery or battery bank, to prevent over-current draw from a battery or battery bank at the starting up of an inverter or more inverters,
The screen display and LED indicators to show the battery voltage, charging current, power in watts and total energy charged in KWH, and/or
web-based or cloud-based control built-in for remote or computer access or mobile devices access and control,
a battery charging control module with adjustable "start" and "stop" voltage setting to connect or disconnect "PVs" terminal and "BAT+" terminal in common negative system, or "BAT−" terminal in common positive system.

9. The photovoltaic power system of claim 1, comprising:
a common negative solar charge maximizing controller that works with common negative MPPT solar charge controller with all the negative terminals of photovoltaic strings & battery negative terminal (BAT−) connected, or
a common positive solar charge maximizing controller that works with common positive MPPT solar charge controller with all the positive terminals of photovoltaic strings & battery positive terminal (BAT+) connected,
one or more MPPT solar charge controllers connecting same or different photovoltaic strings with same (PV+) or different input nominal voltages ("PV1+", "PV2+" and so on, in case of common negative system) to charge the same battery or battery bank and power the same DC load, or
one or more MPPT solar charge controllers connecting same or different photovoltaic strings with same (PV−) or different input nominal voltages ("PV1−", "PV2−" and so on, in case of common positive system) to charge the same battery or battery bank and power the same DC load,
a battery or battery bank that has a total maximum charge current capacity more than the total current capacity (at the nominal voltage) of all solar arrays at the maximum solar radiation condition, minus the minimum current draw from the DC load during the day.

10. The photovoltaic power system of claim 1, may include,
a common positive MPPT solar charge controller in a common negative solar charge maximizing controller system, or
a common negative MPPT solar charge controller in a common positive solar charge maximizing controller system,
however, it must not charge the same battery or battery bank, or power the same DC load as the solar charge maximizing controller does.

11. The photovoltaic power system of claim 1, wherein the common photovoltaic panels with "PVs" split-bolt (or spliced) wire(s) of first array and all photovoltaic panels of second array comprises of claim 1, comprising:
30 cells in a 12V nominal battery voltage system located in cold climate zones, or
36 cells in a 12V nominal battery voltage system located in warm climate zones, or
60 cells in a 24V nominal battery voltage system located in cold climate zones, or
72 cells in a 24V nominal battery voltage system located in warm climate zones, or
120 cells in a 48V nominal battery voltage system located in cold climate zones, or
144 cells in a 48V nominal battery voltage system located in warm climate zones.

12. The photovoltaic power system of claim 1, comprising:
one or more solar charge maximizing controller(s) with same nominal voltage matching the battery or battery bank and DC load nominal voltage, or
more than one solar charge maximizers that have different nominal voltages matching PVs voltage and the nominal voltage of batteries or battery banks.

13. The photovoltaic power system of claim 1, comprising a master solar charge maximizing controller (MSCMC) that is designed and built with many split-bolt wire(s) {or "spliced wire(s)"} connection terminals for different nominal voltage systems, to power the different nominal voltage DC load, and to charge the battery or battery bank with matching nominal voltage.

14. The photovoltaic power system of claim 13, wherein a product model number or name plate of the solar charge maximizing controller (SCMC) of the master solar charge-master maximizer maximizing Controller (MSCMC) of claim 13, comprises:
information of common positive or common negative design, and
a label sticker attached to the maximizing controller for the field technician to record the solar array information, such as "floating array" or "grounded array", and installation date, service phone number information and so on.

15. The photovoltaic power system of claim 13, wherein the master solar charge maximizing controller (MSCMC)

system, comprises an automatic transfer switch (ATS) that is used in the hybrid photovoltaic power system to transfer the load between grid power and inverter power, to maintain the preferred battery voltage range.

16. The solar charge maximizing controller (SCM) system of claim 1, comprising:
  off-grid inverter(s) used in the off-grid system with sufficient battery storage capacity, or
  grid-tie inverter(s) to send power to the grid with minimum battery capacity to maintain the preferred battery voltage range only,
  one inverter for single phase power supply with limited power capacity, or
  three or more inverters for three phase electrical power supply with unlimited power capacities,
  distributed batteries or battery banks in a large scale of the area, and/or
  web-based or cloud-based or remote control to achieve the grid-level smart battery storage and grid-level power generation capacities.

* * * * *